United States Patent
Koker et al.

(10) Patent No.: US 9,390,462 B2
(45) Date of Patent: Jul. 12, 2016

(54) MEMORY MAPPING FOR A GRAPHICS PROCESSING UNIT

(71) Applicant: Intel Corporation, Santa Clara, CA (US)

(72) Inventors: Altug Koker, El Dorado Hills, CA (US); Balaji Vembu, Folsom, CA (US); Murali Ramadoss, Folsom, CA (US); Aditya Navale, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 339 days.

(21) Appl. No.: 13/851,400

(22) Filed: Mar. 27, 2013

(65) Prior Publication Data

US 2014/0267323 A1    Sep. 18, 2014

Related U.S. Application Data (60) Provisional application No. 61/801,079, filed on Mar. 15, 2013.

(51) Int. Cl.
*G06T 1/60* (2006.01)
*G06F 12/10* (2016.01)
*G06F 9/48* (2006.01)

(52) U.S. Cl.
CPC . *G06T 1/60* (2013.01); *G06F 9/485* (2013.01); *G06F 12/1009* (2013.01)

(58) Field of Classification Search
None
See application file for complete search history.

(56) References Cited

U.S. PATENT DOCUMENTS

| 7,623,134 | B1 * | 11/2009 | Danilak | 345/568 |
| 7,711,990 | B1 | 5/2010 | Nickolls et al. | |
| 7,768,522 | B2 * | 8/2010 | Stauffer et al. | 345/568 |
| 2004/0172631 | A1 * | 9/2004 | Howard | 718/100 |
| 2005/0237330 | A1 | 10/2005 | Stauffer et al. | |
| 2009/0182976 | A1 * | 7/2009 | Agesen | 711/207 |
| 2011/0161955 | A1 * | 6/2011 | Woller et al. | 718/1 |
| 2012/0194524 | A1 * | 8/2012 | Hartog | G06T 1/20 345/501 |

FOREIGN PATENT DOCUMENTS

TW    I366151    6/2012

OTHER PUBLICATIONS

OSR Staff, "So What is a Page Fault?," Jun. 5, 2003, http://www.osronline.com/article.cfm?article=222.*
Taiwan Search Report, PCT No. 103107648, mailed on Nov. 5, 2015, 1 page.

* cited by examiner

*Primary Examiner* — Kee M Tung
*Assistant Examiner* — Nicholas R Wilson
(74) *Attorney, Agent, or Firm* — International IP Law Group, P.L.L.C.

(57) ABSTRACT

An electronic device is described herein. The electronic device may include a page walker module to receive a page request of a graphics processing unit (GPU). The page walker module may detect a page fault associated with the page request. The electronic device may include a controller, at least partially comprising hardware logic. The controller is to monitor execution of the page request having the page fault. The controller determines whether to suspend execution of a work item at the GPU associated with the page request having the page fault, or to continue execution of the work item based on factors associated with the page request.

26 Claims, 5 Drawing Sheets

MEMORY MAPPING FOR A GRAPHICS PROCESSING UNIT

REFERENCE TO RELATED APPLICATIONS

This application claims priority to U.S. Provisional Application Ser. No. 61/801,079, filed Mar. 15, 2013 entitled "Memory Mapping For a Graphics Processing Unit." This application is incorporated by reference herein in its entirety.

BACKGROUND ART

Computing devices may include memory management systems that dynamically allocate portions of memory to programs at their request. Virtual address space mapping is a memory mapping mechanism in which virtual addresses are mapped to physical address space. In many cases, the operating system manages the mapping. When an application or a device is initiated, it is allocated a virtual address space that maps to a physical address space.

In some cases, the operating system will use a static pinning design, in which the physical address associated with a virtual address is not reallocated until the application or device releases the physical address. However, static pinning of system resources increases the scarcity of memory resources. In other cases, the operating system will use a dynamic pinning design. In a dynamic pinning design, a virtual address may be associated with a physical address on demand. Based on the demand of the application or device, the physical address may be reallocated to a different application or device.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

The present disclosure relates generally to techniques to enable mapping of virtual addresses associated with work items of a graphics processing unit (GPU). A GPU is an electronic circuit configured to manipulate and alter memory to, in part, accelerate the building of images in a frame buffer intended for output to a display device. The GPU may utilize virtual address spaces that are dynamically pinned and unpinned to physical address spaces based on the demand of the GPU. The GPU may execute a work item that may result in a page request for mapping virtual address spaces to physical address spaces. A controller, configured to monitor the page request, may suspend a work item at the GPU associated with a page request having a page fault based on factors associated with the efficiency at which the page fault is being serviced as discussed in more detail below.

A work item can be an operation executed at the GPU wherein the operation includes a thread of execution. The execution of the thread may generate at least one page request for mapping a virtual address space to a physical address space.

Figure 1:
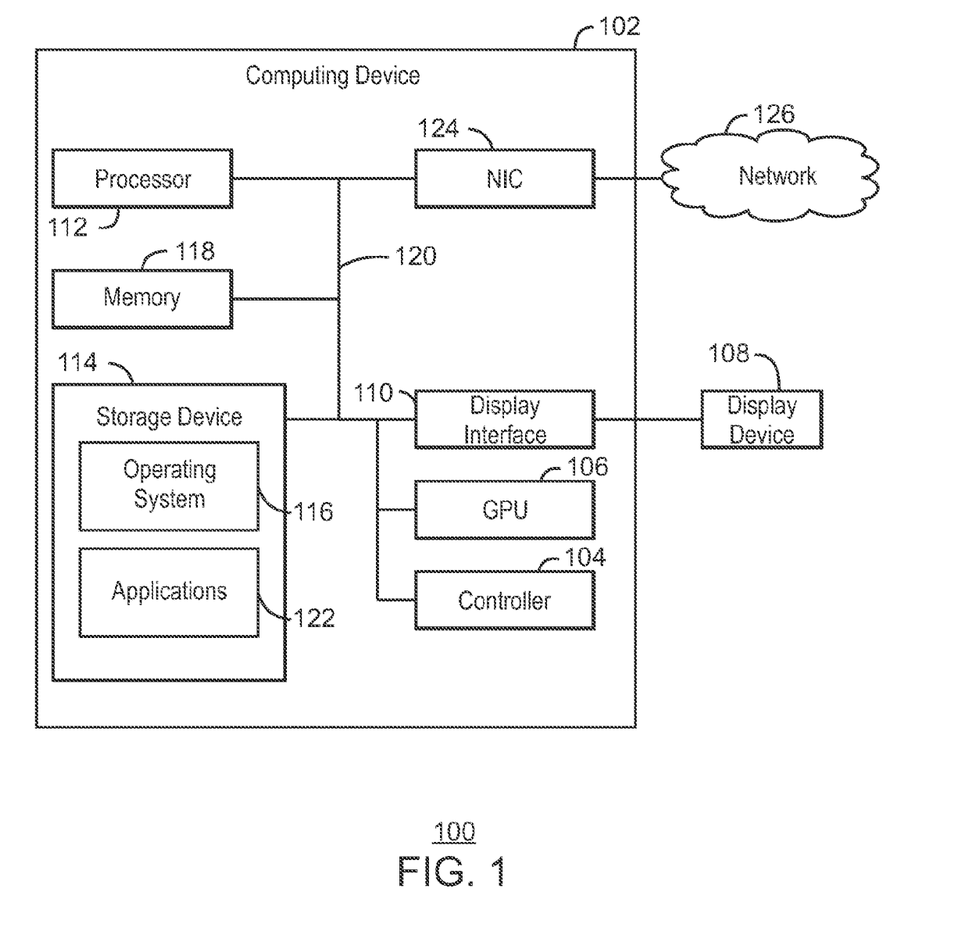
FIG. 1 is a block diagram illustrating a system including a computing device with a controller to monitor page requests associated with work items of a graphics processing unit.

FIG. 1 is a block diagram illustrating a system 100 including a computing device 102 with a controller 104 to monitor page requests associated with work items of a graphics processing unit. The computing device 102 may be, for example, a laptop computer, desktop computer, tablet computer, mobile device, server, or cellular phone, a wearable computing device, among others. The computing device 102 may also include a graphics processing unit (GPU) 106 that processes work items related to computer generated graphics that may be rendered at a display device 108. The display device 108 may be a built-in component of the computing device 102. The display device 108 may also include a computer monitor, television, or projector, among others, that is externally connected to the computing device 102.

The computing device 102 may also include a processor 112 and a storage device 114, comprising a non-transitory computer-readable medium. The storage device 114 may also include an operating system 116. The operating system 116 may be executed by a processor of a host computing system such as the processor 112 of the computing device 102. The operating system 116 is configured to, among other things, manage memory of the computing device 102, including dynamically allocating portions of memory to applications running on the computing device 102. The operating system 116 may dynamically pin and unpin virtual addresses to physical addresses. The GPU 106 may execute work items that may require virtual address that have been dynamically unpinned by the operating system 116, resulting in a page fault. In some embodiments, the storage device 114 has instructions stored thereon that when executed by the processor 112 cause the computing device 102 to perform operations. In some embodiments, the operations include responding to page requests having a page fault from the GPU 106 as discussed in more detail below. The processor 112 may be a main processor that is adapted to execute stored instructions. The computing device 102 may also include a memory device 118 that, in some embodiments, stores instructions that are executable by the processor 112. The processor 112 can be a single core processor, a multi-core processor, a computing cluster, or any number of other configurations. The processor 112 may be implemented as Complex Instruction Set Computer (CISC) or Reduced Instruction Set Computer (RISC) processors, x86 Instruction set compatible processors, multi-core, or any other microprocessor or central processing unit (CPU).

The memory device 118 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems. The memory device 118 may be a part of a memory system discussed in more detail below in reference to FIG. 2. In an embodiment, the instructions could be stored in the storage device 114, the memory device 118, or any combinations thereof.

The main processor 112 may be connected through a system bus 120 (e.g., PCI, ISA, PCI-Express, HyperTransport®, NuBus, etc.) to a display interface 110. The display interface 110 may be adapted to connect the computing device 102 to the display device 108. The GPU 106 may generate work items that indicate page requests for memory pages in a virtual memory system. The controller 104 monitors the page requests encountering page faults, as explained in more detail below. The controller 104 at least partially includes hardware logic. Hardware logic at least partially includes hardware, and may also include software, or firmware. Hardware logic may include electronic hardware including interconnected electronic components which perform analog or logic operations on received and locally stored information to produce as output or store resulting new information or to provide control for output actuator mechanisms. Electronic hardware may include individual chips/circuits and distributed information processing systems.

The storage device 114 may also include one or more applications 122. The applications 122 include, but are not limited to, video playback applications and gaming applications.

A network interface controller (NIC) 124 may be configured to connect the computing device 102 to a network 126. The network 126 can be a wire line network, a wireless network, or a cellular network. The network 126 may be any wide area network (WAN), any local area network (LAN), or the Internet, among others. For example, network 126 can be 3GPP LTE network or a WiFi network.

The block diagram of FIG. 1 is not intended to indicate that the computing device 102 is to include all of the components shown in FIG. 1. Further, the computing device 102 may include any number of additional components not shown in FIG. 1, depending on the details of the specific implementation.

Figure 2:
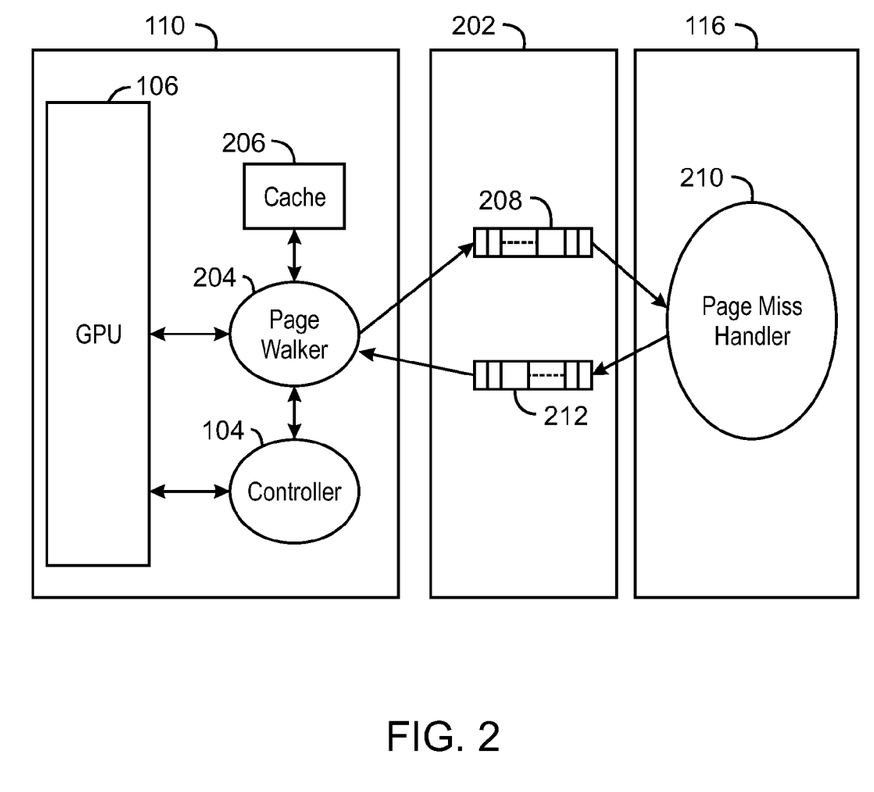
FIG. 2 is a block diagram illustrating the display interface interfacing with a system memory and the operating system.
Figure 3:
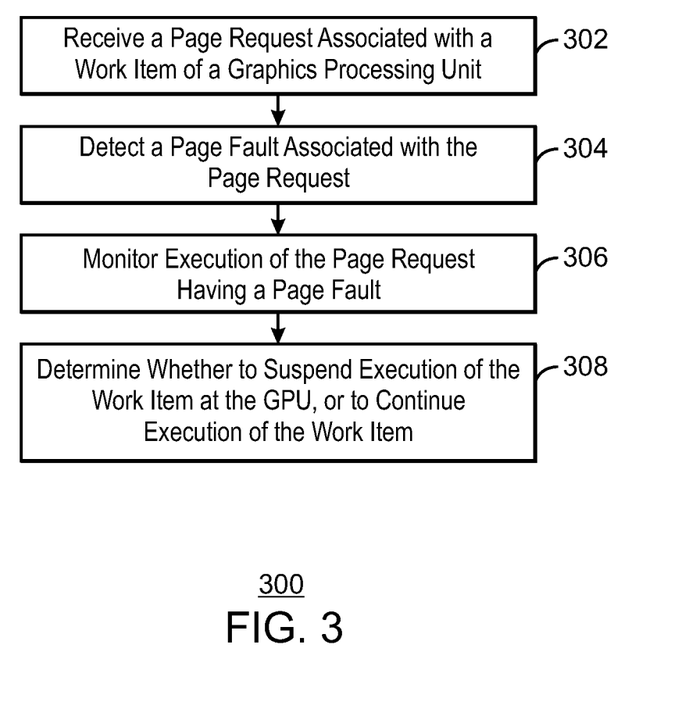
FIG. 3 is a block diagram illustrating a method for monitoring execution of a GPU thread.

FIG. 2 is a block diagram illustrating the display interface 110 interfacing with a system memory 202 and the operating system 116. As illustrated in FIG. 3, the controller 104 and the GPU 106 may be a part of the display interface 110. The system memory 202 may be virtual memory including virtual addresses unique to an accessing process, or a page request. The virtual addresses of the system memory 202 are mapped to physical memory such as the memory device 118 of FIG. 1.

As discussed above in reference to FIG. 1, the GPU 106 is configured to execute work items related to the generation of graphics to be sent to the display device 108. The execution of work items may include the generation of threads indicating page requests. A page is a virtual memory page including, for example, a block of virtual memory. A page request is a request to access a page of the virtual memory of the system memory 202.

The display interface 110 includes a page walker 204 and a cache 206. The page walker 204 may be logic, at least partially comprising hardware logic. The page walker 204 receives a page request associated with a work item of the GPU 106. The page walker 204 determines a physical address associated with a virtual address of the page request. The page walker may determine the physical address by accessing a database, such as a page table, configured to store a mapping between virtual addresses and physical addresses. The page walker 204 may detect a page fault. A page fault occurs when a page associated with the page request has a virtual address but does not have an available or a correct physical address. Detecting the page faults may also be based on attributes of the page request. For example, the attributes include whether a paging entry exists that is associated with the page request. The attributes may also include the read/write attributes of the page requested, privilege levels of the page requested, execution properties of the page requested, any combination of the attributes discussed, and the like.

The page request having the page fault may be loaded into the cache 206. The cache 206 may be a content-addressable memory, such as a translation look-aside buffer (TLB), configured to store page requests having page faults. Subsequent page requests may depend on the particular page request loaded into the cache 206. In these circumstances, the work item being executed by the GPU, and being associated with the page request having a page fault, may be suspended based on factors associated with the page request indicating the efficiency at which the page request having a page fault is being serviced.

A page request having a page fault may be loaded into a page request queue 208. The page request queue 208 is a virtual queue in the system memory 202. The page request queue 208 may provide the page fault to a page miss handler 210 of the operating system 116. The page miss handler 210 services the page request by allocating a physical address to the virtual address indicated in the page fault. The page miss handler 210 may be hardware logic configured to remedy page faults in a virtual memory space of an operating system, such as the operating system 116 of FIG. 1. The page miss handler 210 may include a GPU driver configured to drive page requests from the page request queue 208 at the page miss handler 210. In some embodiments, the page miss handler 210 allocates physical memory and enters a page table entry to map the faulting virtual address to the allocated physical memory. In other words, the page miss handler 210 will correct the page fault by correctly mapping between the virtual address and the physical address.

The page miss handler 210 will provide the corrected mapping to a page response queue 212. The page response queue 212 is a virtual queue of the system memory 202. The page response queue 212 may provide the corrected mapping to the page walker 204. If the controller 106 suspended a work item associated with the page request, the controller may resubmit the work item for execution at the GPU 106.

The controller 104 monitors execution of page requests. As discussed above, the controller 104 may determine whether to suspend a work item of the GPU 106 until a page request having a page fault that is associated with the work item has been serviced by the page miss handler 210. The continuation or suspension determination made by the controller 104 may be carried out in real time to maximize hardware resource utilization while preserving system responsiveness and power. As the work items of the GPU 106 are relatively highly threaded as compared to work items of a CPU, such as the processor 112, it may be necessary to suspend work items to reduce the possibility of stalling the GPU 106 and waiting for a page request to be serviced. The controller 104 may suspend a work item based on various factors including the total number of page requests pending in the page request queue, a time for which a given page request associated with the work item has been pending, the number of subsequent page requests depending on a page request in the page request queue, and any combination thereof. In some embodiments, the controller 104 determines a ratio associating the number of page requests associated with a work item in the page request queue 208 to the number of page responses associated with the work item in the page response queue 212 to determine an efficiency of processing indicating whether page requests are stalling or are actively being serviced by the page miss handler 210. For example, if, for every five page requests associated with a work item in the page request queue 208 at a given time there are four page responses associated with the work item in the page response queue 212, the page requests may be processing at a rate of 80% efficiency. In this example, the controller 104 may not suspend the work item at the GPU 106 as the page requests are processing at an acceptable level. In some embodiments, the controller 104 may determine to suspend a work item based on a threshold efficiency percentage predetermined by a user of the system. In other embodiments, the controller 104 may suspend work items based on other statistical measurements associated with the progress of page faults being serviced by the page miss handler 210.

As another example, the controller 104 may suspend a work item from execution at the GPU 106 based on the utilization of the GPU 106. As the GPU 106 is highly threaded, a work item may be suspended based on how many threads are active and how many threads are suspended.

When the controller 104 suspends a work item, the last page request having a page fault that is associated with the work item will be flagged in the page request queue 208. The last page request may be a packet and may be flagged by a bit within the page request packet. When the page miss handler 210 receives the flagged page request, the page miss handler will trace the page request queue 208 to determine any additional page requests that are associated with the work item. Therefore, all of the page requests related to a work item that has been suspended may be serviced by the page miss handler 210 before servicing any unrelated page requests. The serviced page requests may be provided to the page response queue 212 and received at the controller 104 and the page walker 204. Upon receiving serviced page requests, the controller 104 may resubmit, or reschedule, the work item associated with the serviced page request.

FIG. 3 is a block diagram illustrating a method 300 for monitoring execution of a GPU work item indicating a page request. The method 300 includes, at block 302, receiving the page request associated with a work item of the GPU. The page request may indicate a virtual address of a page in memory. At block 304, a page fault associated with the page request is detected. A page fault may occur when the virtual address indicated in the page request is associated with an incorrect, or unavailable, physical address. At block 306, the page request having the page fault is monitored. The page request may be monitored for the latency and any associated inefficiency. As used herein, latency refers to the time for which the page request has been pending without identifying a correct virtual address to physical address association. At block 308, a determination is made whether to suspend execution of the work item at the GPU associated with the page request, or to continue execution of the work item based on factors of the page request in the context of other page requests of the GPU.

Detecting the page faults is based on attributes of the page request. For example, the attributes include whether a paging entry exists that is associated with the page request. The paging entry may be a mapping of the virtual address associated with the page request to a physical address. The attributes may also include the read/write attributes of the page requested, privilege levels of the page requested, execution properties of the page requested, any combination of the attributes discussed, and the like.

Although not shown in FIG. 3, the method 300 may include searching a database configured to store a mapping between virtual addresses and physical address. The database may be, for example, a page table, or other data structure utilized by a virtual memory system in a computer operating system. The searching may be carried out by a page walking module, such as the page walker discussed above, in reference to FIG. 2.

Dynamic mapping of virtual addresses to physical addresses may result in a virtual address that is not mapped to a physical address that is available. As discussed above in reference to FIG. 2, a page fault is the result of a virtual address that is not mapped to an available physical address. When, at block 304, a page fault is detected, the method 300 may include receiving the page request at a page request queue when a page fault is detected. The page request queue may provide the page request having a page fault to a page miss handler of the operating system of the computing device. The method 300 may include receiving the page request at the page miss handler and allocating, via the page miss handler, a physical address to the virtual address indicated by the page request. The method 300 may include providing the physical address to a page walker of the GPU. In some embodiments, the physical address is provided to a response queue before being provided to the page walker.

A work item associated with a page request having a page fault may be suspended at block 308. Page requests associated with a suspended work item may be listed in a cache, such as a translation look-aside buffer. The method 300 may include caching, and may include resubmitting the work item after the page requests associated with the work item have been serviced by the page miss handler of the operating system. The determination, at block 308, of whether to suspend or continue the execution of the work item may depend on factors associated with the page request. These factors may include the total number of page requests pending, the time for which a page request associated with the work item has been pending, other page requests that depend on the page request pending, a ratio of the number of page requests associated with the work item that have been serviced by the page miss handler to the number of page requests pending in the page request queue, and the like. In some embodiments, the determination to suspend the work item may be based on a statistical threshold, or threshold range, associated with page request servicing efficiency. The determination to suspend the work item may enable the GPU avoid stalling in terms of other work items based on any given work item being associated with a page request having a page fault.

Figure 4:
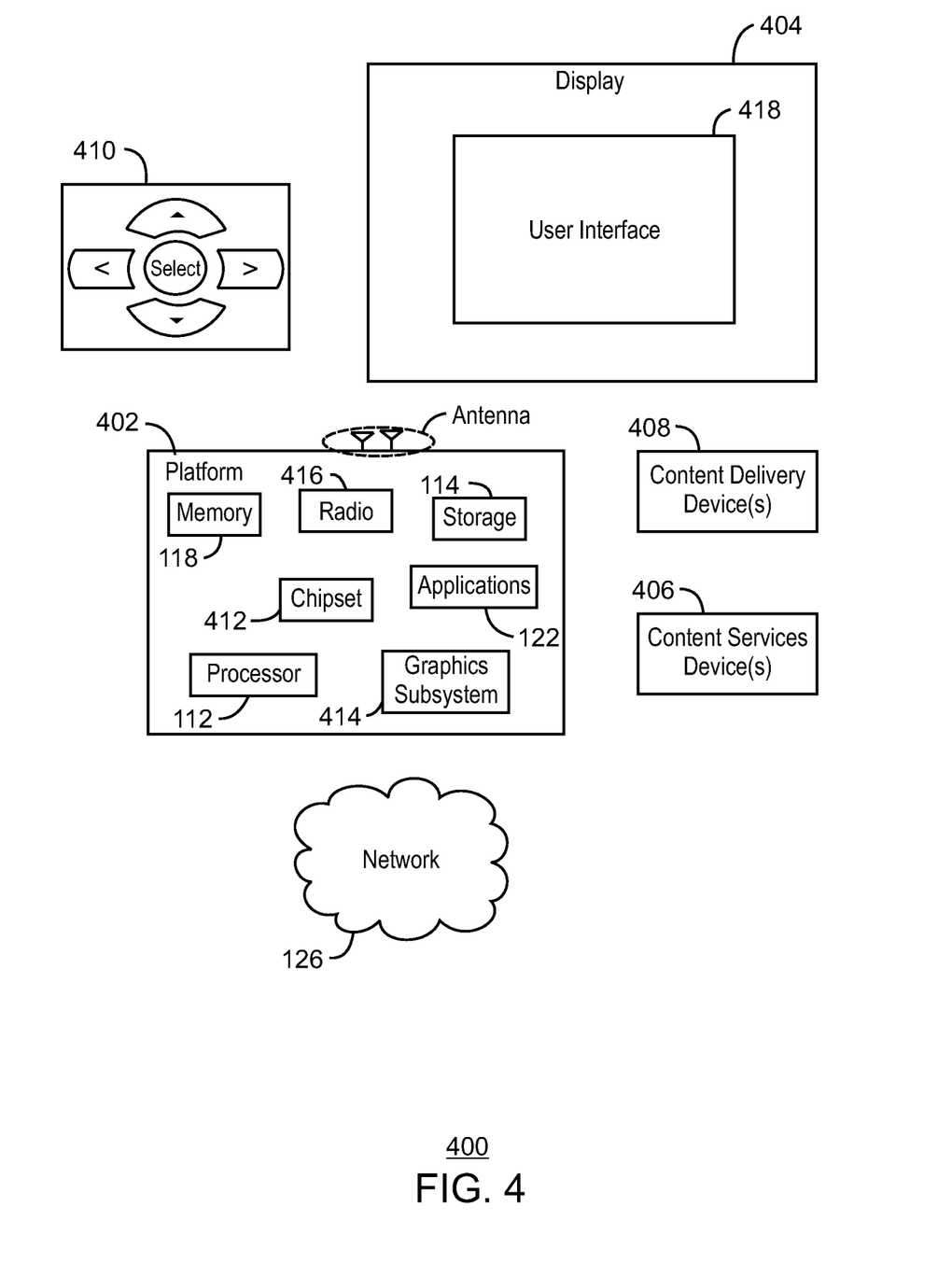
FIG. 4 is a block diagram of an exemplary system for rendering an image.

FIG. 4 is a block diagram of an exemplary system 400 for rendering an image. Like numbered items are as described with respect to FIG. 1. In some embodiments, the system 400 is a media system. In addition, the system 400 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, or the like.

In various embodiments, the system 400 comprises a platform 402 coupled to a display 404. The display 404 may the display 108 of FIG. 1. The platform 402 may receive content from a content device, such as content services device(s) 406 or content delivery device(s) 408, or other similar content sources. A navigation controller 410 including one or more navigation features may be used to interact with, for example, the platform 402 and/or the display 404. Each of these components is described in more detail below.

The platform 402 may include any combination of a chipset 412, a central processing unit (CPU) 202, a memory device 118, a storage device 114, a graphics subsystem 414, applications 122, and a radio 416. The chipset 412 may provide intercommunication among the CPU 202, the memory device 118, the storage device 114, the graphics subsystem 414, the applications 122, and the radio 416. For example, the chipset 412 may include a storage adapter (not shown) capable of providing intercommunication with the storage device 114.

The processor 112 may be implemented as Complex Instruction Set Computer (CISC) or Reduced Instruction Set Computer (RISC) processors, x86 Instruction set compatible processors, multi-core, or any other microprocessor or central processing unit (CPU). In some embodiments, the processor 112 includes dual-core processor(s), dual-core mobile processor(s), or the like.

The memory device 118 may be implemented as a volatile memory device such as, but not limited to, a Random Access Memory (RAM), Dynamic Random Access Memory (DRAM), or Static RAM (SRAM). The storage device 114 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some embodiments, the storage device 114 includes technology to increase handle page faults resulting from page requests that have an invalid virtual to physical address correlation, for example.

The graphics subsystem 414 may perform processing of images such as still or video for display. The graphics subsystem 414 may include a graphics processing unit (GPU), such as the GPU 206, or a visual processing unit (VPU), for example. An analog or digital interface may be used to communicatively couple the graphics subsystem 414 and the display 404. For example, the interface may be any of a High-Definition Multimedia Interface, DisplayPort, wireless HDMI, and/or wireless HD compliant techniques. The graphics subsystem 414 may be integrated into the processor or the chipset 412. Alternatively, the graphics subsystem 414 may be a stand-alone card communicatively coupled to the chipset 412.

The graphics and/or video processing techniques described herein may be implemented in various hardware architectures. For example, graphics and/or video functionality may be integrated within the chipset 412. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

The radio 416 may include one or more radios capable of transmitting and receiving signals using various suitable wireless communications techniques. Such techniques may involve communications across one or more wireless networks. Exemplary wireless networks include wireless local area networks (WLANs), wireless personal area networks (WPANs), wireless metropolitan area network (WMANs), cellular networks, satellite networks, or the like. In communicating across such networks, the radio 416 may operate in accordance with one or more applicable standards in any version.

The display 404 may include any television type monitor or display. For example, the display 404 may include a computer display screen, touch screen display, video monitor, television, or the like. The display 404 may be digital and/or analog. In some embodiments, the display 404 is a holographic display. Also, the display 404 may be a transparent surface that may receive a visual projection. Such projections may convey various forms of information, images, objects, or the like. For example, such projections may be a visual overlay for a mobile augmented reality (MAR) application. Under the control of one or more applications 122, the platform 402 may display a user interface 418 on the display 404.

The content services device(s) 406 may be hosted by any national, international, or independent service and, thus, may be accessible to the platform 402 via the Internet, for example. The content services device(s) 406 may be coupled to the platform 402 and/or to the display 404. The platform 402 and/or the content services device(s) 406 may be coupled to a network 126 to communicate (e.g., send and/or receive) media information to and from the network 126. The content delivery device(s) 408 also may be coupled to the platform 402 and/or to the display 404.

The content services device(s) 406 may include a cable television box, personal computer, network, telephone, or Internet-enabled device capable of delivering digital information. In addition, the content services device(s) 406 may include any other similar devices capable of unidirectionally or bidirectionally communicating content between content providers and the platform 402 or the display 404, via the network 126 or directly. It will be appreciated that the content may be communicated unidirectionally and/or bidirectionally to and from any one of the components in the system 400 and a content provider via the network 126. Examples of content may include any media information including, for example, video, music, medical and gaming information, and so forth.

The content services device(s) 406 may receive content such as cable television programming including media information, digital information, or other content. Examples of content providers may include any cable or satellite television or radio or Internet content providers, among others.

In some embodiments, the platform 402 receives control signals from the navigation controller 410, which includes one or more navigation features. The navigation features of the navigation controller 410 may be used to interact with the user interface 418, for example. The navigation controller 410 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures. Physical gestures include but are not limited to facial expressions, facial movements, movement of various limbs, body movements, body language or any combination thereof. Such physical gestures can be recognized and translated into commands or instructions.

Movements of the navigation features of the navigation controller 410 may be echoed on the display 404 by movements of a pointer, cursor, focus ring, or other visual indicators displayed on the display 404. For example, under the control of the applications 122, the navigation features located on the navigation controller 410 may be mapped to virtual navigation features displayed on the user interface 418. In some embodiments, the navigation controller 410 may not be a separate component but, rather, may be integrated into the platform 402 and/or the display 404.

The system 400 may include drivers (not shown) that include technology to enable users to instantly turn on and off the platform 402 with the touch of a button after initial boot-up, when enabled, for example. Program logic may allow the platform 402 to stream content to media adaptors or other content services device(s) 406 or content delivery device(s) 408 when the platform is turned "off." In addition, the chipset 412 may include hardware and/or software support for 12.1 surround sound audio and/or high definition 7.1 surround sound audio, for example. The drivers may include a graphics driver for integrated graphics platforms. In some embodiments, the graphics driver includes a peripheral component interconnect express (PCIe) graphics card.

In various embodiments, any one or more of the components shown in the system 400 may be integrated. For example, the platform 402 and the content services device(s)

406 may be integrated; the platform 402 and the content delivery device(s) 408 may be integrated; or the platform 402, the content services device(s) 406, and the content delivery device(s) 408 may be integrated. In some embodiments, the platform 402 and the display 404 are an integrated unit. The display 404 and the content service device(s) 406 may be integrated, or the display 404 and the content delivery device(s) 408 may be integrated, for example.

The system 400 may be implemented as a wireless system or a wired system. When implemented as a wireless system, the system 400 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum. When implemented as a wired system, the system 400 may include components and interfaces suitable for communicating over wired communications media, such as input/output (I/O) adapters, physical connectors to connect the I/O adapter with a corresponding wired communications medium, a network interface card (NIC), disc controller, video controller, audio controller, or the like. Examples of wired communications media may include a wire, cable, metal leads, printed circuit board (PCB), backplane, switch fabric, semiconductor material, twisted-pair wire, co-axial cable, fiber optics, or the like.

The platform 402 may establish one or more logical or physical channels to communicate information. The information may include media information and control information. Media information may refer to any data representing content meant for a user. Examples of content may include, for example, data from a voice conversation, videoconference, streaming video, electronic mail (email) message, voice mail message, alphanumeric symbols, graphics, image, video, text, and the like. Data from a voice conversation may be, for example, speech information, silence periods, background noise, comfort noise, tones, and the like. Control information may refer to any data representing commands, instructions or control words meant for an automated system. For example, control information may be used to route media information through a system, or instruct a node to process the media information in a predetermined manner. The embodiments, however, are not limited to the elements or the context shown or described in FIG. 4.

Figure 5:
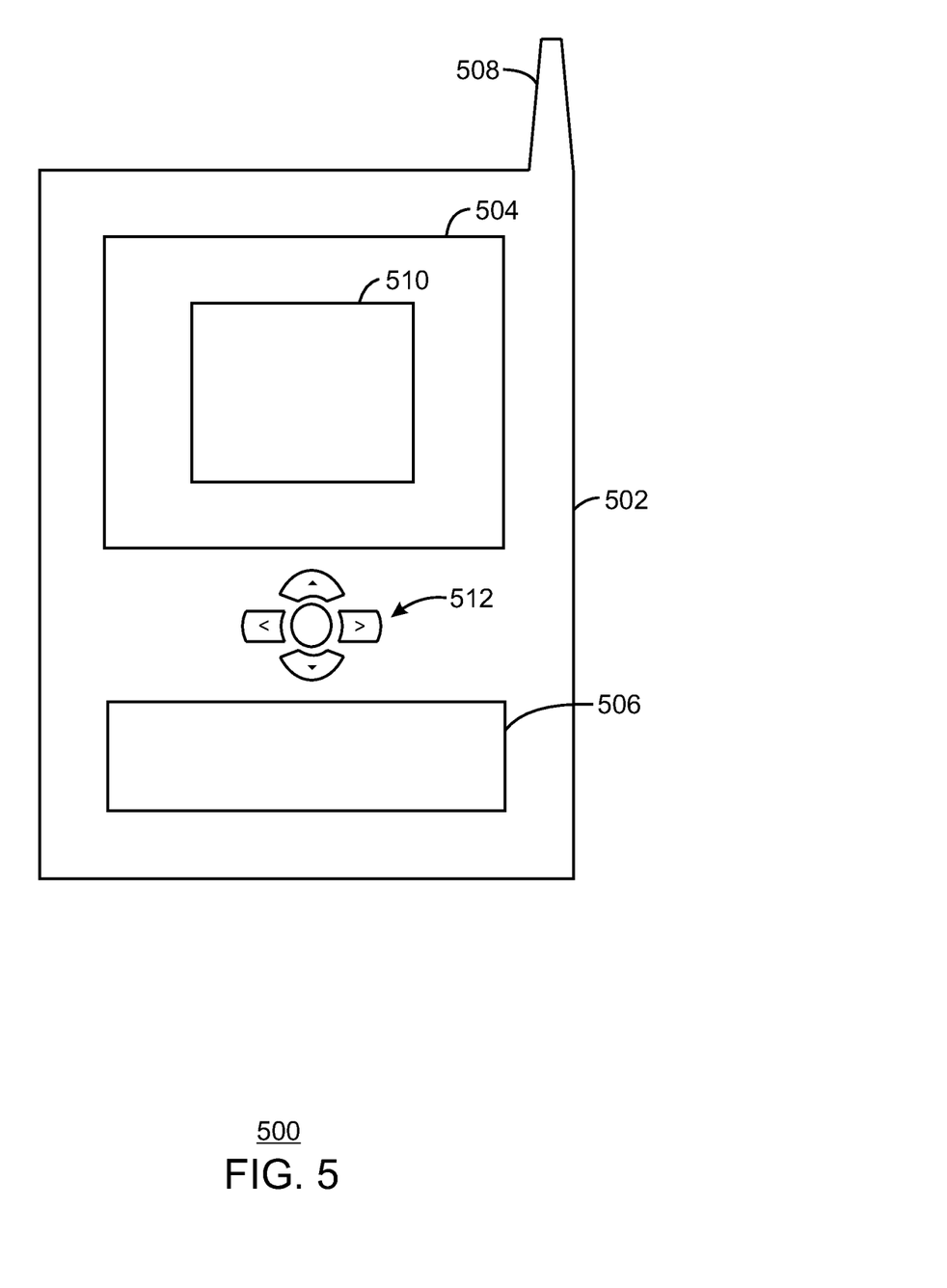
FIG. 5 is a schematic of a small form factor device in which the system of FIG. 4 may be embodied.

FIG. 5 is a schematic of a small form factor device 500 in which the system 400 of FIG. 4 may be embodied. Like numbered items are as described with respect to FIG. 4. In some embodiments, for example, the device 500 is implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and the like.

An example of a mobile computing device may also include a computer that is arranged to be worn by a person, such as a wrist computer, finger computer, ring computer, eyeglass computer, belt-clip computer, arm-band computer, shoe computer, clothing computer, or any other suitable type of wearable computer. For example, the mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well.

As shown in FIG. 5, the device 500 may include a housing 502, a display 504, an input/output (I/O) device 506, and an antenna 508. The device 500 may also include navigation features 510. The display 504 may include any suitable display unit for displaying information appropriate for a mobile computing device. The I/O device 506 may include any suitable I/O device for entering information into a mobile computing device. For example, the I/O device 506 may include an alphanumeric keyboard, a numeric keypad, a touch pad, input keys, buttons, switches, rocker switches, microphones, speakers, a voice recognition device and software, or the like. Information may also be entered into the device 500 by way of microphone. Such information may be digitized by a voice recognition device.

Example 1

A method for enabling operations of a graphics processing unit is described herein. The method includes receiving a page request associated with a work item of a graphics processing unit (GPU). The method includes detecting a page fault associated with the page request. The execution of the page request is monitored. The method includes determining whether to suspend execution of the work item at the GPU associated with the page request having a page fault, or to continue execution of the work item.

Example 2

An electronic device for enabling operations of a graphics processing unit is described herein. The electronic device includes a page walker module to a page walker module to receive a page request of a graphics processing unit (GPU). The page walker module is to detect a page fault associated with the page request. The electronic device includes a controller, at least partially including hardware logic, to monitor execution of the page request having the page fault. The controller is to determine whether to suspend execution of a work item at the GPU associated with the page request having the page fault, or to continue execution of the work item.

Example 3

A system for enabling memory operations of a graphic processing unit is described herein. The system includes a display device. The system includes a memory, wherein virtual memory addresses are dynamically mapped to physical memory addresses of the memory. The system includes a graphics processing unit (GPU) to generate a work item associated with rendering an image for display using the display device, wherein the work item is to indicate a page request. The system includes a page walker to receive the page request and to detect a page fault associated with the page request. The system includes a controller at least partially including hardware logic, wherein the controller is to monitor execution of the page request having the page fault. The controller is to determine whether to suspend the work item having the page fault from execution at the GPU, or to continue execution of the work item.

Some embodiments may be implemented in one or a combination of hardware, firmware, and software. Some embodiments may also be implemented as instructions stored on the tangible non-transitory machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A system, comprising:
    a display device;
    a memory, wherein virtual memory addresses are dynamically mapped to physical memory addresses of the memory;
    a graphics processing unit (GPU) to generate a work item associated with rendering an image for display using the display device, wherein the work item is to indicate a page request;
    a page walker to receive the page request and to detect a page fault associated with the page request; and
    a controller at least partially comprising hardware logic, wherein the controller is to:
        monitor execution of the page request having the page fault; and
        determine whether to suspend the work item having the page fault from execution at the GPU, or to continue execution of the work item, the determination based on a factor of the page request in a context of other page requests, wherein the controller is to suspend execution of the work item based on a factor associated with the work item comprising a ratio of the number of page requests associated with the work item that have been serviced by a page miss handler and a number of page requests associated with the work item that are pending in a page request queue.

2. The system of claim 1, wherein the page walker is to detect page faults based on attributes of the page request, the attributes comprising:
    existence of a paging entry associated with the page request;
    read/write attributes;
    privilege levels;
    execution properties; or
    any combination thereof.

3. The system of claim 1, wherein the page request indicates a virtual address and the page walker is to attempt to determine a physical address associated with the virtual address.

4. The system of claim 1, wherein the page walker is to provide the page request to the page request queue when the page fault is detected.

5. The system of claim 1, wherein the page miss handler receives the page request having the page fault from the page request queue, wherein to service the page request, the page miss handler is to allocate a physical address to a virtual address indicated by the page request and provide the physical address to the page walker.

6. The system of claim 5, wherein the controller is to suspend execution of the work item based on at least one additional factor associated with the work item comprising:
    a total number of page requests pending; and
    a time for which a page request associated with the work item has been pending.

7. The system of claim 5, wherein the controller is to resubmit the suspended work item to the GPU after the physical address associated with the page request associated with the work item has been provided to the page walker.

8. The system of claim 1, comprising a cache, wherein the cache is to store page faults until a physical address is allocated to a virtual address indicated by the page request.

9. An electronic device, comprising:
a page walker module to:
receive a page request of a graphics processing unit (GPU); and
detect a page fault associated with the page request; and
a controller, at least partially comprising hardware logic, to:
monitor execution of the page request having the page fault; and
determine whether to suspend execution of a work item at the GPU associated with the page request having the page fault, or to continue execution of the work item, the determination based on a factor of the page request in a context of other page requests, wherein the controller is to suspend execution of the work item based on a factor associated with the work item comprising a ratio of the number of page requests associated with the work item that have been serviced by a page miss handler and a number of page requests associated with the work item that are pending in a page request queue.

10. The electronic device of claim 9, wherein the page walker module is to detect page faults based on attributes of the page request, the attributes comprising:
existence of a paging entry associated with the page request;
read/write attributes;
privilege levels;
execution properties;
or any combination thereof.

11. The electronic device of claim 9, wherein the page request indicates a virtual address, and wherein to determine a physical address associated with the virtual address, the page walker module is to search a database configured to store a mapping between virtual addresses and physical addresses.

12. The electronic device of claim 11, wherein the page fault is the result of a virtual address that is not mapped to an available physical address.

13. The electronic device of claim 9, wherein the page request is received by the page request queue when the page fault is detected.

14. The electronic device of claim 13, wherein the page miss handler module receives the page request having the page fault from the page request queue, wherein to service the page request, the page miss handler module is to allocate a physical address to a virtual address indicated by the page request and provide the physical address to the page walker module.

15. The electronic device of claim 14, wherein the controller is to suspend execution of the work item based on at least one additional factor associated with the work item comprising:
a total number of page requests pending; and
a time for which a page request associated with the work item has been pending.

16. The electronic device of claim 14, wherein the controller is to resubmit the suspended work item to the GPU after the physical address associated with the page request associated with the work item has been provided to the page walker module.

17. The electronic device of claim 9, comprising a cache, wherein the cache is to store page faults until a physical address is allocated to a virtual address indicated by the page request.

18. A method, comprising:
receiving a page request associated with a work item of a graphics processing unit (GPU);
detecting a page fault associated with the page request;
monitoring execution of the page request having a page fault; and
determining whether to suspend execution of the work item at the GPU associated with the page request having a page fault, or to continue execution of the work item, the determining based on a factor of the page request in a context of other page requests, wherein the controller is to suspend execution of the work item based on a factor associated with the work item comprising a ratio of the number of page requests associated with the work item that have been serviced by a page miss handler and a number of page requests associated with the work item that are pending in a page request queue.

19. The method of claim 18, wherein detecting the page fault is based on attributes of the page request, the attributes comprising:
existence of a paging entry associated with the page request;
read/write attributes;
privilege levels;
execution properties; or
any combination thereof.

20. The method of claim 18, wherein the page request indicates a virtual address, comprising searching a database configured to store a mapping between virtual addresses and physical addresses.

21. The method of claim 20, wherein the page fault is the result of a virtual address that is not mapped to an available physical address.

22. The method of claim 18, comprising receiving the page request at the page request queue when the page fault is detected.

23. The method of claim 18, comprising:
receiving, at the page miss handler of an operating system, the page request having the page fault from the page request queue;
servicing the page request, via the page miss handler, by allocating a physical address to a virtual address indicated by the page request; and providing the physical address to a page walker of the GPU.

24. The method of claim 18, comprising suspending execution of the work item based on at least one additional factor associated with the work item comprising:
a total number of page requests pending; and
a time for which a page request associated with the work item has been pending.

25. The method of claim 23, comprising resubmitting suspended work items to the GPU after the physical address associated with the page request has been provided to the page walker.

26. The method of claim 18, comprising storing page faults in a cache until a physical address is allocated to a virtual address indicated by the page request.

* * * * *